United States Patent
Peiris et al.

(10) Patent No.: US 11,252,122 B2
(45) Date of Patent: *Feb. 15, 2022

(54) SYSTEMS AND METHODS FOR SHARING CONTENT

(71) Applicant: Facebook, Inc., Menlo Park, CA (US)

(72) Inventors: Keith Lanka Peiris, San Francisco, CA (US); Tomasz Zawada, San Francisco, CA (US); Justin David Aguilar, San Francisco, CA (US); Ayca Cakmakli, San Francisco, CA (US); Ian McIntyre Silber, San Jose, CA (US); Jiajun Wang, San Francisco, CA (US); Maria Ioveva, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 15/809,749

(22) Filed: Nov. 10, 2017

(65) Prior Publication Data

US 2018/0295080 A1    Oct. 11, 2018

Related U.S. Application Data

(60) Provisional application No. 62/483,926, filed on Apr. 10, 2017.

(51) Int. Cl.
*G06F 15/16* (2006.01)
*H04L 12/58* (2006.01)
*G06Q 50/00* (2012.01)

(52) U.S. Cl.
CPC ............. *H04L 51/32* (2013.01); *G06Q 50/01* (2013.01); *H04L 51/16* (2013.01); *H04L 51/36* (2013.01); *H04L 51/046* (2013.01); *H04L 51/10* (2013.01)

(58) Field of Classification Search
CPC ......... H04L 51/10; H04L 51/32; H04L 51/04; H04L 51/16; H04L 51/36; H04L 2209/60; H04L 51/02; H04L 51/046; H04L 51/24; H04L 51/26; H04L 63/0428; G06F 3/04883; G06Q 50/01
See application file for complete search history.

(56) References Cited

U.S. PATENT DOCUMENTS

| | | |
|---|---|---|
| 9,185,062 B1 | 11/2015 | Yang et al. |
| 10,134,095 B2 | 11/2018 | Kennon et al. |
| 2005/0216901 A1* | 9/2005 | Speare .................. G06F 21/606 717/168 |
| 2009/0100141 A1 | 4/2009 | Kirkland et al. |
| 2009/0265255 A1 | 10/2009 | Jackson et al. |

(Continued)

*Primary Examiner* — Dustin Nguyen
*Assistant Examiner* — Hao H Nguyen
(74) *Attorney, Agent, or Firm* — Sheppard Mullin Richter & Hampton LLP

(57) ABSTRACT

Systems, methods, and non-transitory computer-readable media can determine a first ephemeral message to be shared through a first unified message thread corresponding to a group of recipients, the first ephemeral message being created by a user operating the computing device. The first ephemeral message can be provided to a social networking system for distribution to the group of recipients through the first unified message thread, wherein both ephemeral messages and non-ephemeral messages are exchanged between the group of recipients through the same first unified message thread.

19 Claims, 17 Drawing Sheets

(56) References Cited

U.S. PATENT DOCUMENTS

| | | | |
|---|---|---|---|
| 2013/0110957 A1 | 5/2013 | Siegel et al. | |
| 2013/0254408 A1* | 9/2013 | Sreenivasan | G06Q 10/10 709/227 |
| 2013/0332526 A1* | 12/2013 | Hurley | G06F 3/0488 709/204 |
| 2014/0351713 A1 | 11/2014 | Sjostedt et al. | |
| 2015/0033132 A1 | 1/2015 | Zheng et al. | |
| 2015/0088784 A1* | 3/2015 | Dhara | G06N 5/02 706/11 |
| 2015/0271120 A1* | 9/2015 | Langholz | H04L 51/16 709/206 |
| 2015/0281148 A1 | 10/2015 | Masterson et al. | |
| 2016/0078035 A1 | 3/2016 | Ball et al. | |
| 2016/0359773 A1* | 12/2016 | Shi | H04L 51/04 |
| 2017/0048180 A1* | 2/2017 | Kim | G06Q 50/30 |
| 2017/0249306 A1 | 8/2017 | Allen et al. | |
| 2017/0310617 A1 | 10/2017 | Wada | |
| 2017/0336926 A1 | 11/2017 | Chaudhri et al. | |
| 2017/0336927 A1 | 11/2017 | Chaudri et al. | |
| 2017/0353416 A1* | 12/2017 | Brooks | H04L 67/10 |
| 2018/0032212 A1 | 2/2018 | Choi et al. | |
| 2018/0032233 A1 | 2/2018 | Choi et al. | |
| 2018/0032515 A1 | 2/2018 | Choi et al. | |
| 2018/0032619 A1 | 2/2018 | Choi et al. | |
| 2018/0034757 A1 | 2/2018 | Choi et al. | |
| 2018/0034818 A1 | 2/2018 | Choi et al. | |
| 2018/0048604 A1* | 2/2018 | Mikhailov | H04L 51/16 |
| 2018/0097757 A1 | 4/2018 | Nguyen et al. | |
| 2018/0159812 A1 | 6/2018 | Sarafa et al. | |
| 2018/0241871 A1* | 8/2018 | Sarafa | H04M 1/72552 |
| 2018/0275749 A1 | 9/2018 | Yoon et al. | |
| 2018/0279016 A1* | 9/2018 | Tang | H04N 21/8113 |
| 2018/0295080 A1* | 10/2018 | Peiris | H04L 51/16 |
| 2018/0295091 A1* | 10/2018 | Peiris | H04L 51/32 |
| 2018/0295092 A1 | 10/2018 | Peiris et al. | |
| 2019/0079941 A1 | 3/2019 | Sarkar et al. | |
| 2019/0190872 A1* | 6/2019 | Peiris | H04L 51/22 |
| 2020/0304481 A1* | 9/2020 | Rathore | G06F 21/6218 |
| 2020/0304516 A1* | 9/2020 | Lazar | H04L 63/20 |

* cited by examiner

500

Determine a first ephemeral message to be shared through a first unified message thread corresponding to a group of recipients, the first ephemeral message being created by a user operating a computing device
502

Provide the first ephemeral message to a social networking system for distribution to the group of recipients through the first unified message thread, wherein both ephemeral messages and non-ephemeral messages are exchanged between the group of recipients through the same first unified message thread
504

FIGURE 5A

SYSTEMS AND METHODS FOR SHARING CONTENT

CROSS-REFERENCE TO RELATED APPLICATIONS

This application claims priority to U.S. Provisional Patent Application No. 62/483,926, filed on Apr. 10, 2017 and entitled "SYSTEMS AND METHODS FOR SHARING CONTENT", which is incorporated in its entirety herein by reference.

FIELD OF THE INVENTION

The present technology relates to the field of content sharing. More particularly, the present technology relates to techniques for sharing content with users in a networking environment.

BACKGROUND

Users often utilize computing devices for a wide variety of purposes. Users can use their computing devices to, for example, interact with one another, access media content, share media content, and create media content. In some cases, media content can be provided by members of a social network. The media content can include one or a combination of text, images, videos, and audio. The media content may be published to the social network for consumption by others.

Under conventional approaches, users may post various content items to a social networking system. In general, content items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed. Further, some content produced by the first user can be provided to other users through direct messaging supported by the social networking system.

SUMMARY

Various embodiments of the present disclosure can include systems, methods, and non-transitory computer readable media configured to perform determining a first ephemeral message to be shared through a first unified message thread corresponding to a group of recipients, the first ephemeral message being created by a user operating the computing device; and providing the first ephemeral message to a social networking system for distribution to the group of recipients through the first unified message thread, wherein both ephemeral messages and non-ephemeral messages are exchanged between the group of recipients through the same first unified message thread.

In some embodiments, the first ephemeral message is sent with a message request to at least one recipient in the group, and wherein the first ephemeral message cannot be viewed by the recipient until the recipient accepts the message request.

In some embodiments, the recipient is permitted to view text associated with the first ephemeral message without having accepted the message request but not the remainder of the first ephemeral message itself.

In some embodiments, the first ephemeral message is not shown to the user operating the computing device in the first unified message thread.

In some embodiments, the user operating the computing device is permitted to view the first ephemeral message in the first unified message thread for a pre-defined number of times.

In some embodiments, the systems, methods, and non-transitory computer readable media are configured to perform determining that the user operating the computing device has selected an option to recall the first ephemeral message; and preventing recipients in the group from accessing the first ephemeral message.

In some embodiments, the systems, methods, and non-transitory computer readable media are configured to perform providing an interface including a set of options for sharing the first ephemeral message, the set of options including at least a first option for sharing the first ephemeral message as a story and a second option for sharing the first ephemeral message through the first unified message thread corresponding to the group of recipients; and determining that the user operating the computing has selected at least the second option.

In some embodiments, the systems, methods, and non-transitory computer readable media are configured to determining at least one notification corresponding to the first ephemeral message, the notification describing a seen state for a recipient in the group; and providing the notification for display through the computing device.

In some embodiments, the seen state indicates the first ephemeral message was delivered to the recipient, viewed by the recipient, or replayed by the recipient.

In some embodiments, access to the first ephemeral message expires after occurrence of some pre-defined event, and wherein access to a non-ephemeral message does not expire.

Various embodiments of the present disclosure can include systems, methods, and non-transitory computer readable media configured to provide a messaging interface, the messaging interface including one or more options for accessing at least one unified message thread, wherein both ephemeral messages and non-ephemeral messages are exchanged between a group of users through the unified message thread. A determination can be made that a user operating the computing device has created a message to be sent through the unified message thread. The message can be provided for distribution to the group of users through the unified message thread.

In some embodiments, the message is an ephemeral message or a non-ephemeral message.

In some embodiments, the systems, methods, and non-transitory computer readable media are configured to perform determining that the user selected an option to reply to an ephemeral message in the unified message thread; and executing a camera application for capturing content to be included in the message.

In some embodiments, the user performed a first gesture when selecting the option to reply, and wherein the camera application is configured to capture images in response to the first gesture.

In some embodiments, the user performed a second gesture when selecting the option to reply, and wherein the camera application is configured to capture video in response to the second gesture.

In some embodiments, the message is sent with the captured content through the unified message thread as an ephemeral message.

In some embodiments, access to the ephemeral message expires after occurrence of some pre-defined event.

In some embodiments, the systems, methods, and non-transitory computer readable media are configured to perform determining that the user selected an option to reply to a non-ephemeral message in the unified message thread; and providing a virtual keyboard for inputting text to be included in the message.

In some embodiments, the message is sent with the inputted text through the unified message thread as a non-ephemeral message.

In some embodiments, access to a non-ephemeral message does not expire.

Various embodiments of the present disclosure can include systems, methods, and non-transitory computer readable media configured to provide a messaging interface, the messaging interface including one or more options for accessing at least one unified message thread, wherein both ephemeral messages and non-ephemeral messages are exchanged between a group of users through the unified message thread. A determination can be made that a user operating the computing device has accessed the unified message thread. Content relating to the unified message thread can be provided for display through the computing device.

In some embodiments, a name of the unified message thread is shown in a distinctive color when at least one unseen ephemeral message is accessible through the unified message thread.

In some embodiments, the systems, methods, and non-transitory computer readable media are configured to perform providing unseen messages in the unified message thread for display through an immersive content viewer.

In some embodiments, unseen ephemeral messages are presented before unseen non-ephemeral messages.

In some embodiments, the unified message thread is accessible through a chevron associated with the unified message thread.

In some embodiments, the systems, methods, and non-transitory computer readable media are configured to perform providing access to the unified message thread through an interface, wherein one or more messages exchanged through the unified message thread are individually accessible.

In some embodiments, the unified message thread is associated with a set of avatars corresponding to users that sent one or more messages through the unified message thread.

In some embodiments, the avatars correspond to users that sent ephemeral messages which have not been viewed.

In some embodiments, the avatars are ordered and presented as a stack.

In some embodiments, avatars corresponding to users that sent ephemeral messages are ordered before avatars corresponding to users that sent non-ephemeral messages.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIGS. 5A-5C illustrate an example methods, according to an embodiment of the present disclosure.

Figure 1:
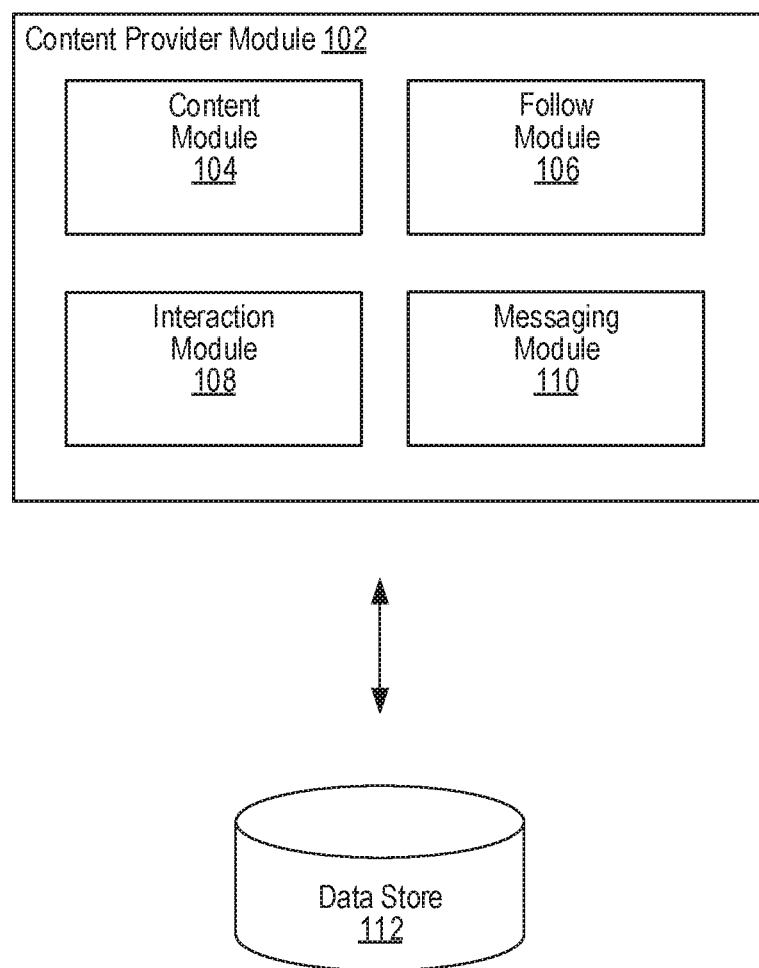
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Sharing Content

As mentioned, users often utilize computing devices for a wide variety of purposes. Users can use their computing devices to, for example, interact with one another, access media content, share media content, and create media content. In some cases, media content items can include postings from members of an online community or platform, such as a social network. The postings may include one or a combination of text, images, videos, and audio. The postings may be published to the social network for consumption by others. Under conventional approaches, media content items posted by a member can be included in a profile of the member on the social network. In other instances, media content items posted by the member can appear in respective media content feeds of other users who are members of the social network. The other users can be connections of the member who posted the media content items.

Under conventional approaches, users can confront various challenges when exchanging messages (or direct messages, instant message, etc.) with other users through a social networking system. In some instances, users may want to send certain messages without having to worry about those messages being accessible for some extended period of time. Further, having the option to send messages with limited lifespan can help users express themselves more fully when communicating with other users. For example, a user may be more willing to send a video of the user singing if the video is accessible for only a limited period of time. In other instances, users may be less concerned about messages being available indefinitely. Conventional techniques employed by a social networking system often cannot accommodate these dual interests. Accordingly, user experience can suffer, discouraging users from sharing content through the social networking system.

An improved approach rooted in computer technology overcomes the foregoing and other disadvantages associated with conventional approaches specifically arising in the realm of computer technology. The present technology can determine a first ephemeral message to be shared through a first unified message thread corresponding to a group of recipients. The first ephemeral message can be created by a user operating a computing device. The first ephemeral message can be provided to a social networking system for distribution to the group of recipients through the first unified message thread. Both ephemeral messages and non-ephemeral messages can be exchanged between the group of recipients through the same first unified message thread. As used herein, messages exchanged "between" users or a group of users can include exchanges between two users and exchanges among three or more users. More details relating to the disclosed technology are provided below.

FIG. 1 illustrates an example system 100 including an example content provider module 102, according to an embodiment of the present disclosure. As shown in the example of FIG. 1, the content provider module 102 can include a content module 104, a follow module 106, an interaction module 108, and a messaging module 110. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6.

The content provider module 102 can be configured to communicate and/or operate with the at least one data store 112, as shown in the example system 100. The at least one data store 112 can be configured to store and maintain various types of data. For example, the data store 112 can store information describing various content that has been posted or selectively shared by users of a social networking system. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

The content module 104 can be configured to provide users with access to content (e.g., media content items) that is available through a social networking system. In some instances, this content can include content items that are posted in content feeds accessible through the social networking system. For example, the content module 104 can provide a first user with access to media content items through an interface that is provided by a software application (e.g., a social networking application) running on a computing device of the first user. The first user can also interact with the interface to post content items to the social networking system. Such content items may include text, images, audio, and videos, for example. For example, the first user can submit a post to be published through the social networking system. In some embodiments, the post can include, or reference, one or more content items. In some embodiments, posts published through the social networking system must include at least one content item.

In various embodiments, other users of the social networking system can access content items posted by the first user. In one example, the other users can access the content items by searching for the first user, for example, by user name through an interface provided by a software application (e.g., a social networking application, browser, etc.) running on their respective computing devices. In some instances, some users may want to see content items posted by the first user in their respective content feed. To cause content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all content items that are posted by the first user can automatically be included in the respective content feed of the user. If the user decides that they no longer want to see content from the first user in their respective content feed, the user can select an option through the interface to "unfollow" the first user. As a result, the follow module 106 can remove the association between the user and the first user so that content items posted by the first user are no longer included in the content feed of the user.

In some instances, users may want to interact with posted content items. For example, a user may want to endorse, or "like", a content item. In this example, the user can select an option provided in the interface to like the desired content item. The interaction module 108 can determine when a user likes a given content item and can store information describing this relationship. The interaction module 108 can also determine when other forms of user interaction are performed and can store information describing the interaction (e.g., information describing the type of interaction, the identity of the user, the identity of the user that posted the content item, and the content item, to name some examples). For example, the user may want to post a comment in response to a content item. In this example, the user can select an option provided in the interface to enter and post the comment for the desired content item. The interaction module 108 can determine when a user posts a comment in response to a given content item and can store information describing this relationship. Other forms of user interaction can include reacting to a content item (e.g., selecting an option that corresponds to a particular reaction, such as happy, sad, angry, etc.) and sharing a content item, to name some examples.

In various embodiments, the messaging module 110 is configured to provide direct messaging (or instant messaging) options to users of the social networking system. For example, users can exchange direct messages with other users of the social networking system. The messages can include any combination of text, images, video, audio, and other types of content. In some embodiments, users can decide whether messages are sent as ephemeral messages or non-ephemeral messages. More details regarding the messaging module 110 will be provided below with reference to FIG. 2.

Figure 2:
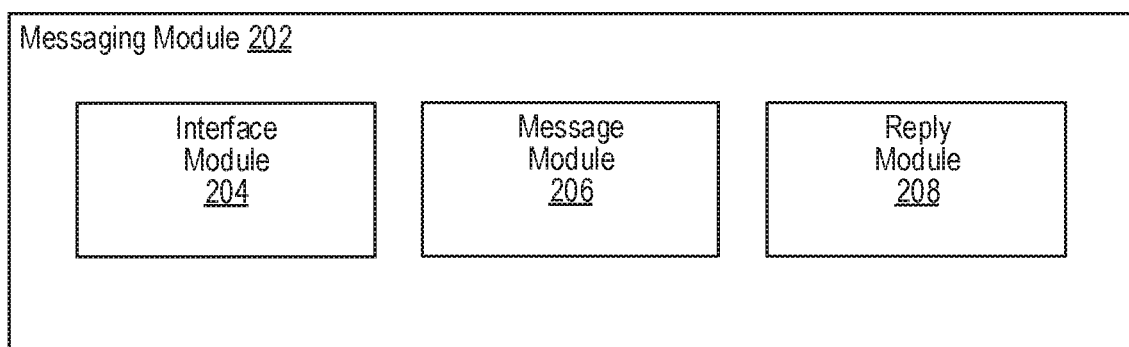
FIG. 2 illustrates an example messaging module, according to an embodiment of the present disclosure.

FIG. 2 illustrates a messaging module 202, according to an embodiment of the present disclosure. In some embodiments, the messaging module 110 of FIG. 1 can be implemented with the messaging module 202. As shown in the example of FIG. 2, the messaging module 202 can include an interface module 204, a message module 206, and a reply module 208.

In various embodiments, the interface module 204 can be configured to provide a graphical user interface through which a user can send messages and access received messages. In general, a message may be sent as an ephemeral message or a non-ephemeral message. More details regarding the interface module 204 will be provided below with reference to FIG. 3A.

In some embodiments, the message module 206 can provide various options for creating and/or sending messages (e.g., ephemeral messages, non-ephemeral messages) through a social networking system. In some embodiments, messages can include text or content (e.g., images, videos, or audio), or a combination thereof. As mentioned, a user has the option to send messages as ephemeral messages and/or non-ephemeral messages. In various embodiments, both ephemeral messages and non-ephemeral messages exchanged between a group of users can be sent through a unified message thread corresponding to that group. A unified message thread for a group of users (e.g., a user and one or more other users) can be created, for example, when an initial message is communicated among users in the group. This unified message thread can be used to manage communications between the users in the group on an on-going basis. The membership of such unified message threads can vary over time, for example, as new users are added to the group or when existing users leave the group. More details regarding the message module 206 will be provided below with reference to FIG. 3B.

In various embodiments, the reply module 208 can provide various options for replying to messages through the social networking system. In some embodiments, the options available for replying to a given message may vary based on whether the message is ephemeral or non-ephemeral. More details regarding the reply module 208 will be provided below with reference to FIG. 3C.

Figure 3A:
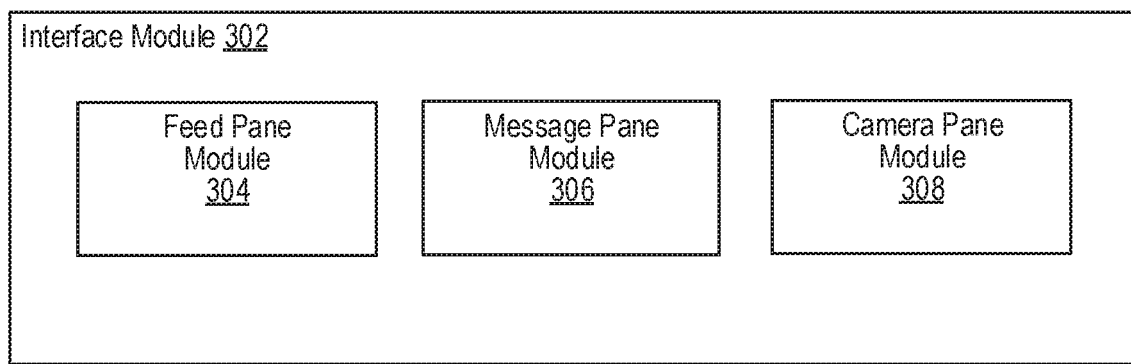
FIG. 3A illustrates an example interface module, according to an embodiment of the present disclosure.

FIG. 3A illustrates an example interface module 302, according to an embodiment of the present disclosure. In some embodiments, the interface module 204 of FIG. 2 can be implemented with the interface module 302. As shown in the example of FIG. 3A, the interface module 302 can include a feed pane module 304, a message pane module 306, and a camera pane module 308.

In various embodiments, the interface module 302 can be configured to provide a graphical user interface through which a user can access content and exchange messages. For example, this interface may be provided through a software application (e.g., social networking application) running on a computing device being operated by the user. In some embodiments, the interface provides various functionality through different panes (or screens) that are accessible through the interface.

For example, in some embodiments, the feed pane module 304 can be configured to provide access to various content (or media) feeds that are accessible through the social networking system. These content feeds may include ephemeral content feeds and/or non-ephemeral content feeds corresponding to users of the social networking system. An ephemeral content feed of a given user can include ephemeral media content items that were shared by that user. In some embodiments, ephemeral messages posted in the user's ephemeral content feed are accessible by other users of the social networking system and/or by other users that are following the user. A non-ephemeral content feed of a given user can include non-ephemeral media content items that were shared by that user. Further, in some embodiments, non-ephemeral messages posted in the user's non-ephemeral content feed are accessible by other users of the social networking system and/or by other users that are following the user.

In some embodiments, the message pane module 306 provides access to a message pane through which the user can send and access messages (e.g., ephemeral messages, non-ephemeral messages). For example, the user can access the message pane by selecting an option through the interface and/or by performing a touch screen gesture (e.g., swipe gesture). The message pane can provide the user with access to unified message threads. In some embodiments, ephemeral messages and non-ephemeral messages exchanged between a group of users can be accessed through the same unified message thread corresponding to that group.

In some embodiments, the camera pane module 308 provides access to a camera pane through which users can capture various forms of media content items (e.g., images, videos, looping videos, etc.). For example, the user can access the camera pane by selecting an option through the interface and/or by performing a touch screen gesture (e.g., swipe gesture). In some embodiments, accessing the camera pane causes a camera application to execute on the computing device being operated by the user. In some instances, the camera pane module 308 can automatically activate the camera application when the user selects an option to reply to an ephemeral message. Once activated, the user can interact with the camera application to produce content (e.g., an ephemeral media content item) that can be sent as a response to the ephemeral message.

Figure 3B:
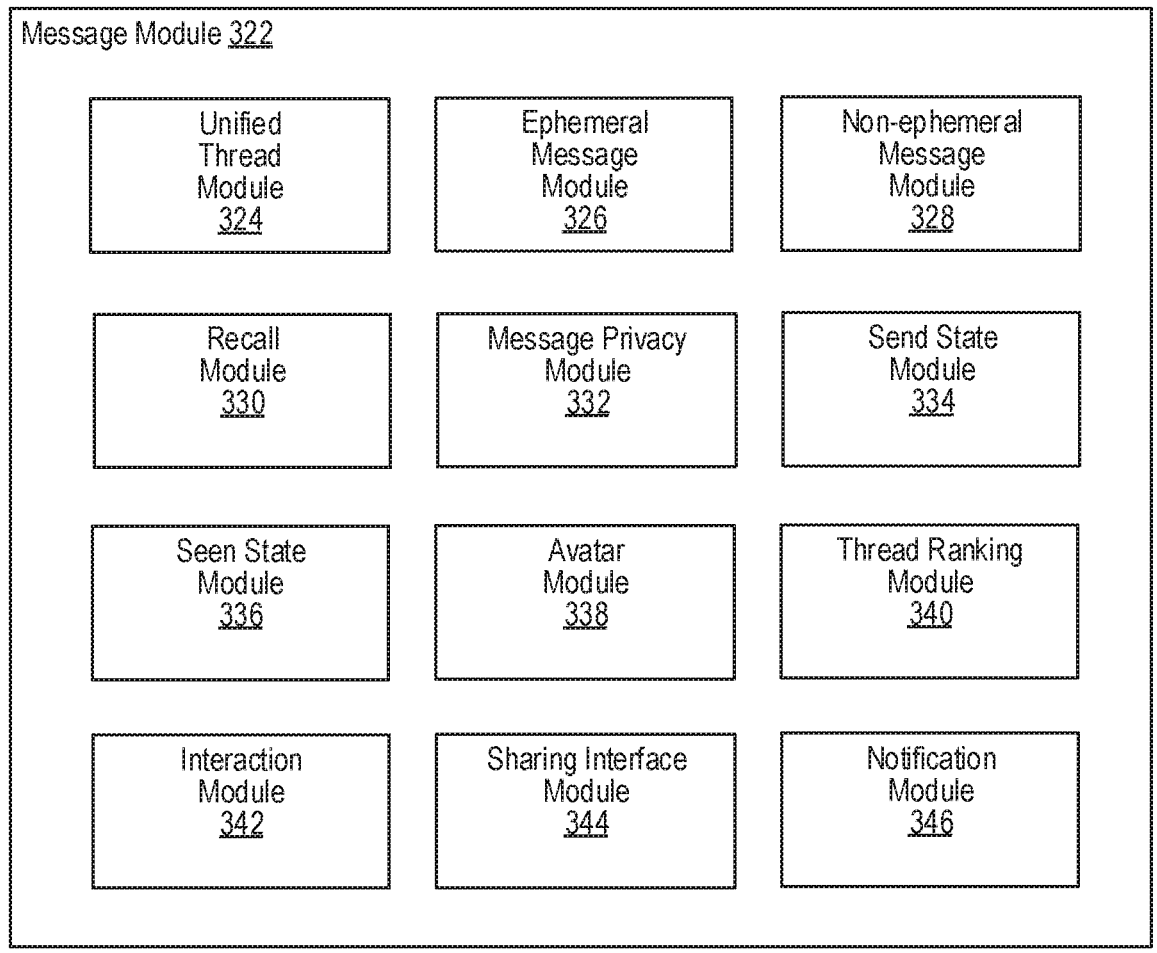
FIG. 3B illustrates an example message module, according to an embodiment of the present disclosure.

FIG. 3B illustrates an example message module 322, according to an embodiment of the present disclosure. In some embodiments, the message module 206 of FIG. 2 can be implemented with the message module 322. As shown in the example of FIG. 3B, the message module 322 can include a unified thread module 324, an ephemeral message module 326, a non-ephemeral message module 328, a recall module 330, a message privacy module 332, a send state module 334, a seen state module 336, an avatar module 338, a thread ranking module 340, an interaction module 342, a sharing interface module 344, and a notification module 346.

The unified thread module 324 can be configured to manage messages exchanged between users. In various embodiments, the unified thread module 324 can create and manage unified message threads through which users can exchange both ephemeral messages and non-ephemeral messages. For example, a user can select an option to send a message (e.g., ephemeral message, non-ephemeral message). Upon selecting the option, the user can create the message and provide the names (or usernames) of one or more recipients of the message. After selecting an option to send the message, the unified thread module 324 can create a unified message thread that manages messages (e.g., ephemeral messages, non-ephemeral messages) exchanged between the user and the one or more recipients. If a unified message thread between the user and the recipients already exists, then the unified thread module 324 can send the message through the existing unified message thread. Thus, depending on the types of messages communicated by members of a given unified message thread, the unified message thread may include only non-ephemeral messages, only ephemeral messages, or a combination thereof.

The ephemeral message module 326 provides functionality for sending and accessing ephemeral messages. In some embodiments, the ephemeral message module 326 can regulate access to ephemeral messages. For example, in some embodiments, an ephemeral message sent to a designated recipient can be accessible by the recipient until some pre-defined event. For example, the ephemeral message can remain accessible to the recipient until the recipient has accessed (e.g., seen) the ephemeral message through the social networking system. In instances where an ephemeral message was sent to a group of users, the ephemeral message can remain accessible to each recipient in the group until that recipient has accessed (e.g., seen) the ephemeral message through the social networking system. In some embodiments, ephemeral messages sent to a given recipient can be accessed by the recipient for some pre-defined number of times (e.g., once, twice, etc.) after which the ephemeral messages can no longer be accessed by the recipient. In some embodiments, once this pre-defined limit is reached, a view option associated with the ephemeral message becomes a tombstone (or anchor) to indicate that a user previously sent an ephemeral message. Similarly, an ephemeral message sent to a group of users can remain accessible by each user for some pre-defined number of times (e.g., once, twice, etc.). Thus, each recipient can access the ephemeral message for the pre-defined number of times after which the ephemeral message can no longer be accessed by that recipient. In some embodiments, an ephemeral message accessed during a given session can continue to be accessed by the user during the same session for some pre-defined period of time. In some embodiments, a session may be defined as a period of time during which the user accesses a unified message thread through which the ephemeral message was received. In some embodiments, the session begins when the user enters the unified message thread and ends when the user exists the unified message thread. In some embodiments, the ephemeral message module 326 restricts the types of content that can be sent as ephemeral messages. For example, in some embodiments, messages being sent as ephemeral messages may be restricted to visual content (e.g., images, videos, graphical text, animated text, etc., and combinations thereof). In such embodiments, at least some of this visual content may be captured using a camera application provided by the camera pane module 308.

In some embodiments, the non-ephemeral message module 328 provides functionality for sending and accessing non-ephemeral messages. In some embodiments, the non-ephemeral message module 328 can regulate access to non-ephemeral messages. For example, in some embodiments, a non-ephemeral message can be accessible to a designated recipient for an indefinite period of time (e.g., permanently) without having its expiration, if any, being conditioned on some pre-defined event, some pre-defined period of time, or a limit to the number of times the non-ephemeral message may be accessed. In some embodiments, the non-ephemeral message module 328 can restrict messages being sent as non-ephemeral messages to text-based messages. For instance, such text-based messages can appear in a predetermined style, font, and size that a user cannot customize. In some embodiments, content can also be sent as non-ephemeral messages. For example, this content may include content items (e.g., images, videos, etc.) accessible through a media gallery that is stored in (or accessible through) the user's computing device. In some embodiments, text-based messages and messages including content being shared from a media gallery are treated as non-ephemeral messages.

In some embodiments, the recall module 330 can provide an option to recall messages (e.g., ephemeral messages, non-ephemeral messages). For example, a user that sent a message can recall the message provided that no recipients have viewed the message. Once recalled, no recipient of the message will be able to access the message. In some embodiments, such access restrictions for the message can be enabled by expiring a Uniform Resource Locator (URL) that references the message.

In some embodiments, messaging between users may be restricted based on various criteria. For example, in some embodiments, the message privacy module 332 may require that a first user to be following a second user before any messages from the second user can be sent to the first user. In some embodiments, the message privacy module 332 may require that the first user and the second user to be following one another before any messages can be communicated between the first user and the second user. In some embodiments, such restrictions may be limited to ephemeral messages communicated between the first user and the second user. In some embodiments, a first user may send an ephemeral message or a non-ephemeral message to any other user of the social networking system. In such embodiments, the message privacy module 332 can send the message with a message request. The recipient of the message can accept the message request to view the message. In some embodiments, once a message request from a sender is accepted by a recipient, subsequent messages from the sender are delivered to the recipient without additional message requests. In some embodiments, when the message is an ephemeral message, the recipient is permitted to view any text associated with the ephemeral message without having accepted the message request but not the remainder of the ephemeral message itself. For example, text associated with the ephemeral message may be a description that was provided for content (e.g., images, videos, etc.) included in the ephemeral message.

In some embodiments, ephemeral and non-ephemeral messages exchanged between users can be assigned respective send states. For example, in some embodiments, a message sent through the social networking system is assigned a timestamp indicating when the message was sent. This timestamp can be shown in a corresponding message thread through which the message was communicated, for example. In some embodiments, the send state module 334 can assign a corresponding state to the sent message. In such embodiments, the state for the sent message may be "delivered" when the message has been delivered to its recipients, "seen" (or "read") when the message has been accessed (or viewed) by a threshold number of the recipients (e.g., one recipient, all recipients, etc.), or "replayed" when the message was re-accessed (or replayed) by a threshold number of the recipients (e.g., one recipient, all recipients, etc.).

In some embodiments, seen states can be managed differently depending on whether a message is an ephemeral message or a non-ephemeral message. For example, in some embodiments, the seen state module 336 can maintain seen states for ephemeral messages on a per-message basis. In some embodiments, a corresponding seen state can be maintained for each recipient of an ephemeral message. In such embodiments, the seen state can indicate whether the recipient has accessed (or viewed) the ephemeral message. For example, an ephemeral message sent to a first user and a second user can be associated with a first seen state corresponding to the first user and a second seen state corresponding to the second user. These seen states can be used to determine which ephemeral messages still need to be presented to a given user. For example, when a user accesses a given unified message thread, the seen state module 336 can identify ephemeral messages sent through the unified message thread that have not been seen by the user. These unseen ephemeral messages can then be presented to the user, for example, in chronological order through an immersive content viewer.

In some embodiments, a seen state corresponding to a given ephemeral message and user is managed using a uniform resource locator (URL) that references the ephemeral message. In such embodiments, a timestamp indicating when the user accessed the ephemeral message can be appended to the URL. In some embodiments, this timestamp is signed using a cryptographic key to ensure its authenticity. Any user attempts to access the ephemeral message after this timestamp will be denied. In instances where the ephemeral message is sent to a group of users, then a separate URL and timestamp can be maintained for each user in the group.

In some embodiments, the seen state module 336 can maintain seen states for non-ephemeral messages on a per-thread basis. For example, in some embodiments, a corresponding seen state can be maintained for each unified message thread that is accessible to a given user. In such embodiments, the seen state can indicate whether the user has accessed a given unified message thread. Thus, for example, the seen state for a unified message thread that includes one or more unseen non-ephemeral messages, none of which have been accessed by the user, will indicate that the user has not viewed the messages. In this example, once the user has accessed the unified message thread, the seen state will be updated to indicate that the user has viewed messages in the thread even if the user has not viewed all of the messages, such as new messages.

The avatar module 338 can be configured to manage and display avatars that are representative of content in a given unified message thread. For example, in some embodiments, users can select respective avatars. In one example, a user may create an avatar using a content item (e.g., static image, animated image, video, etc.) that is representative of the user. In some embodiments, this avatar can be shown alongside messages sent by the user so that recipients of those messages can easily associate the messages with the user. In some embodiments, a set of avatars associated with a unified message thread can be presented as a stack. In such embodiments, each avatar in the stack can each represent a user that is a member of the unified message thread. In some embodiments, avatars associated with a unified message thread correspond to users that sent ephemeral messages which have not been viewed. In some embodiments, avatars associated with a given message thread correspond to users that sent ephemeral messages and/or non-ephemeral messages which have not been viewed. In some embodiments, a set of avatars associated with a unified message thread can be layered (or ranked). In some embodiments, layering (or ranking) of the set of avatars can be customized. For example, in some embodiments, an avatar of a user that sent the oldest unseen ephemeral message is displayed on top of a stack of avatars. In some embodiments, when a given message thread includes ephemeral messages and non-ephemeral messages, avatars corresponding to users that sent the ephemeral messages are prioritized in appearance over, or shown at a level in a stack higher than, avatars corresponding to users that sent the non-ephemeral messages. In some embodiments, when a set of avatars associated with a unified message thread is selected, any unseen ephemeral messages sent through the unified message thread can be presented or displayed. In some embodiments, these unseen ephemeral messages are played (or displayed) chronologically in the order they were received, for example, through an immersive content viewer.

The thread ranking module 340 can be configured to determine an order (or rank) in which unified message threads are presented in an interface. In some embodiments, the ranking of unified message threads is personalized for each user. For example, in some embodiments, the thread ranking module 340 ranks unified message threads based on how often a user interacts with a given message thread. For example, a first unified message thread can be ranked higher than a second unified message thread if the first unified message thread is accessed more often than the second unified message thread. In some embodiments, the thread ranking module 340 ranks unified message threads based on how many messages the user sends through a given message thread. For example, a first unified message thread can be ranked higher than a second unified message thread if the user sends more messages through the first unified message thread than the second unified message thread. In some embodiments, the thread ranking module 340 ranks unified message threads based on a relationship strength between the user and one or more members of a given unified message thread. For example, a first unified message thread can be ranked higher than a second unified message thread if the first unified message thread includes at least one member having a stronger relationship strength (or affinity score) to the user than any members included in the second unified message thread. In some embodiments, unified message threads can be identified and suggested to a user as candidates for sending a message using the approaches described above. The user can select any of these unified message threads to cause the message to be delivered to members of that unified message thread.

The interaction module 342 can provide options for interacting with messages exchanged through unified message threads. For example, in some embodiments, users can like messages (e.g., double tap to like) sent by other members of the message thread. Other forms of user interaction can include reacting to a content item (e.g., selecting an option that corresponds to a particular reaction, such as happy, sad, angry, etc.) and sharing a content item, to name some examples.

The sharing interface module 344 can provide a user with options for sharing messages (e.g., ephemeral messages, non-ephemeral messages) with other users. In some embodiments, the sharing interface module 344 can provide an interface that includes an option for sharing a message as a story, as described in more detail herein. In this example, the shared story may be published through the user's ephemeral content feed. In some embodiments, the sharing interface module 344 can provide options for sharing the message through one or more unified message threads. In some embodiments, the sharing interface module 344 can rank options corresponding to unified message threads in a sharing interface. In some embodiments, unified message threads can be ranked for a user based on relationship strengths (or affinity scores) between the user and one or more members in the unified message threads. For example, a first unified message thread that includes a first member can be ranked higher than a second unified message thread that includes a second member when an affinity score between the user and the first member is greater than an affinity score between the user and the second member. In some embodiments, unified message threads can be ranked based on members with whom the user frequently communicates. For example, in some embodiments, a first unified message thread that includes a first member can be ranked higher than a second unified message thread that includes a second member when the user and the first member communicate more frequently than the user and the second member. In some embodiments, unified message threads can be ordered manually based on user preference. For example, the user has the option to make certain unified message threads sticky. In such embodiments, these sticky unified message threads remain in the order specified by the user regardless of any algorithmically determined order.

The notification module 346 can send notifications to users that share content (e.g., ephemeral messages, non-ephemeral messages). In some embodiments, a sender of a given message can be provided notifications corresponding to each recipient of the message. For example, the sender can be notified when the message has been delivered to a recipient. In another example, the sender can be notified when a recipient views the message. In yet another example, the sender can be notified when a recipient replays (or re-accesses) the message. In some embodiments, a sender can be notified when another user (e.g., recipient) captures a screenshot of the sender's message. In general, notifications may be provided through an interface (e.g., messaging interface) or as direct messages.

Figure 3C:
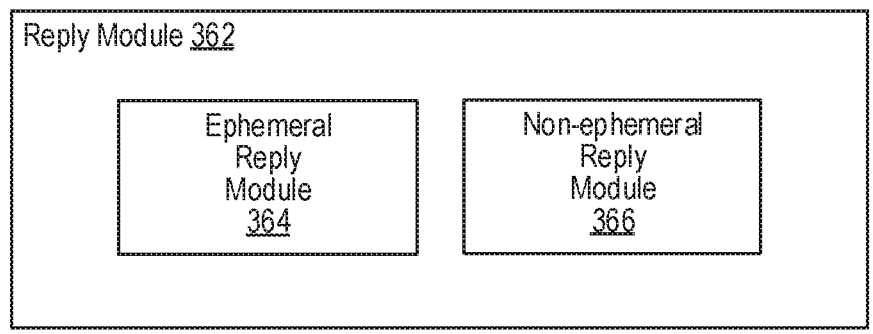
FIG. 3C illustrates an example reply module, according to an embodiment of the present disclosure.

FIG. 3C illustrates an example reply module 362, according to an embodiment of the present disclosure. In some embodiments, the reply module 208 of FIG. 2 can be implemented with the reply module 362. As shown in the example of FIG. 3C, the reply module 362 can include an ephemeral reply module 364 and a non-ephemeral reply module 366.

As mentioned, users typically have the option to reply to messages received from other users. In some embodiments, the options available for replying to a given message can vary based on whether the message is ephemeral or non-ephemeral. For example, when a user receives an ephemeral message, the ephemeral reply module 364 can provide the user with options for responding to the ephemeral message. In some embodiments, the ephemeral reply module 364 provides the user with an option to reply to the ephemeral message with the user's own ephemeral message. In such embodiments, the ephemeral reply module 364 provides the user with an option to create a new ephemeral message. In some embodiments, the user can generate the ephemeral message by creating visual content (e.g., images, videos, graphical text, animated text, etc., and combinations thereof) that will be provided as the ephemeral message. In some embodiments, at least some of this visual content may be captured using a camera application provided by the camera pane module 308. In some embodiments, the visual content is created using various tools for sending graphical text responses. For example, graphical text responses may be created using tools for inputting text such as a virtual keyboard. In this example the inputted text can be decorated, for example, by applying different colors, fonts, and/or animations, to name some examples. In some embodiments, the ephemeral reply module 364 provides the user with an option to reply to an ephemeral message with a non-ephemeral message. In such embodiments, the non-ephemeral message will appear in the same unified message thread through which the ephemeral message was sent.

In various embodiments, when a first user receives a non-ephemeral message from a second user, the non-ephemeral reply module 366 can provide the first user with options for responding to the non-ephemeral message. In some embodiments, the non-ephemeral reply module 366 provides the first user with an option to reply to the non-ephemeral message with the first user's own non-ephemeral message. In such embodiments, the non-ephemeral reply module 366 provides the first user with an option to create a new non-ephemeral message. For example, the first user can create and send a new text-based message in response to the received non-ephemeral message. In this example, the text-based message is sent through a unified message thread that is created between the first user and the second user. As mentioned, in various embodiments, any ephemeral messages exchanged between the first user and the second user can also appear in this same unified message thread. In some embodiments, the first user also has the option to send content-based messages in response to the non-ephemeral message. For example, the first user can select an option to access a gallery of content items (e.g., images, videos, etc.) that are available to be shared. These content items may be stored on a computing device being operated by the first user or may otherwise be available to the computing device, for example, through cloud-based storage.

Figure 4A:
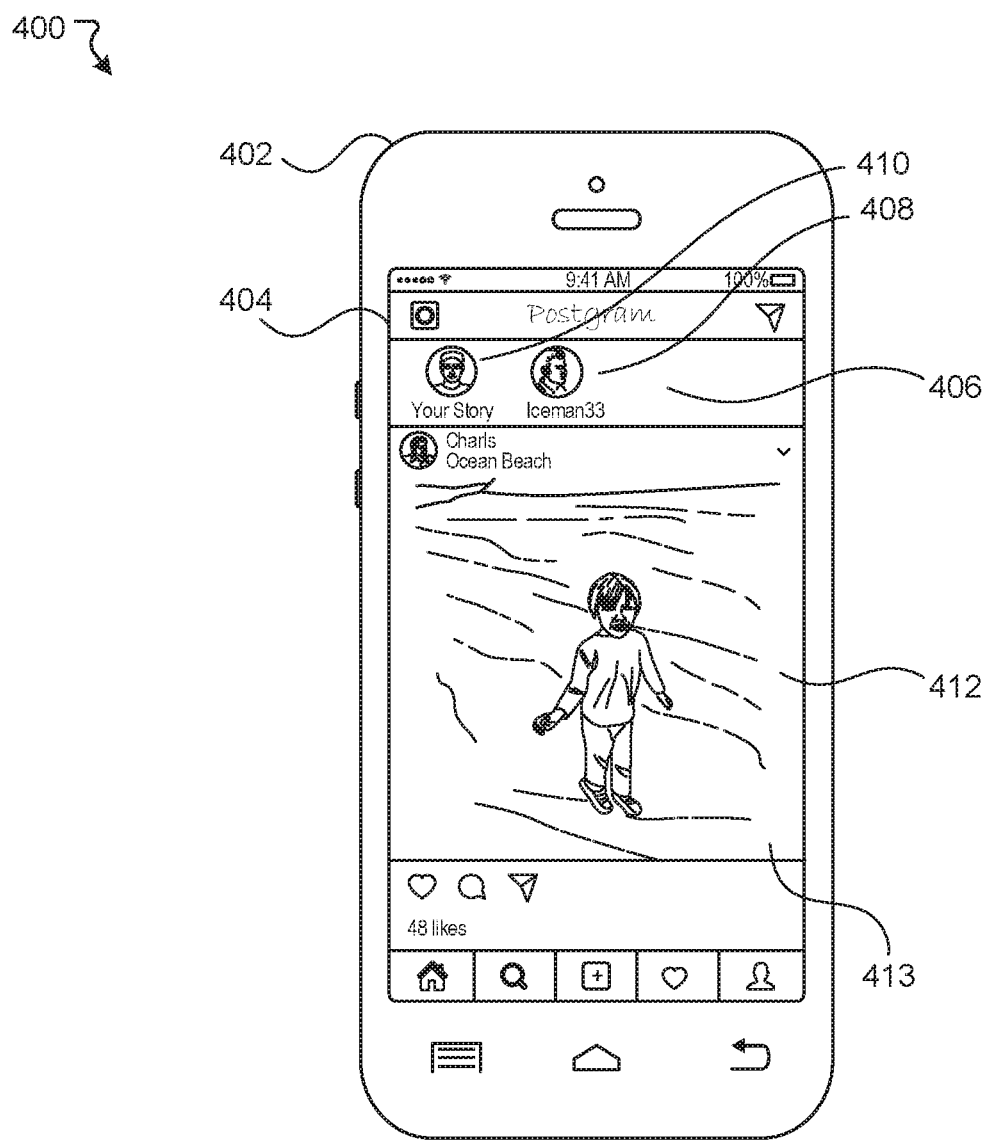
FIGS. 4A-4J illustrate example interfaces, according to an embodiment of the present disclosure.

FIG. 4A illustrates an example 400 of an interface 404, according to an embodiment of the present disclosure. In this example, the interface 404 is presented through a display screen of a computing device 402. Further, the interface 404 may be provided through an application (e.g., a web browser, a social networking application, messenger application, etc.) running on the computing device 402 that is configured to interact with a social networking system.

In the example of FIG. 4A, the interface 404 corresponds to a feed pane that provides access to one or more ephemeral content feeds 408 through a first region 406 of the interface 404. The ephemeral content feeds 408 include an ephemeral content feed 410 corresponding to a user operating the computing device 402. The feed pane also provides access to a non-ephemeral content feed corresponding to the user through a second region 412 of the interface 404. In this example, the non-ephemeral content feed includes a content item 413 that was published in the non-ephemeral content feed.

Figure 4B:
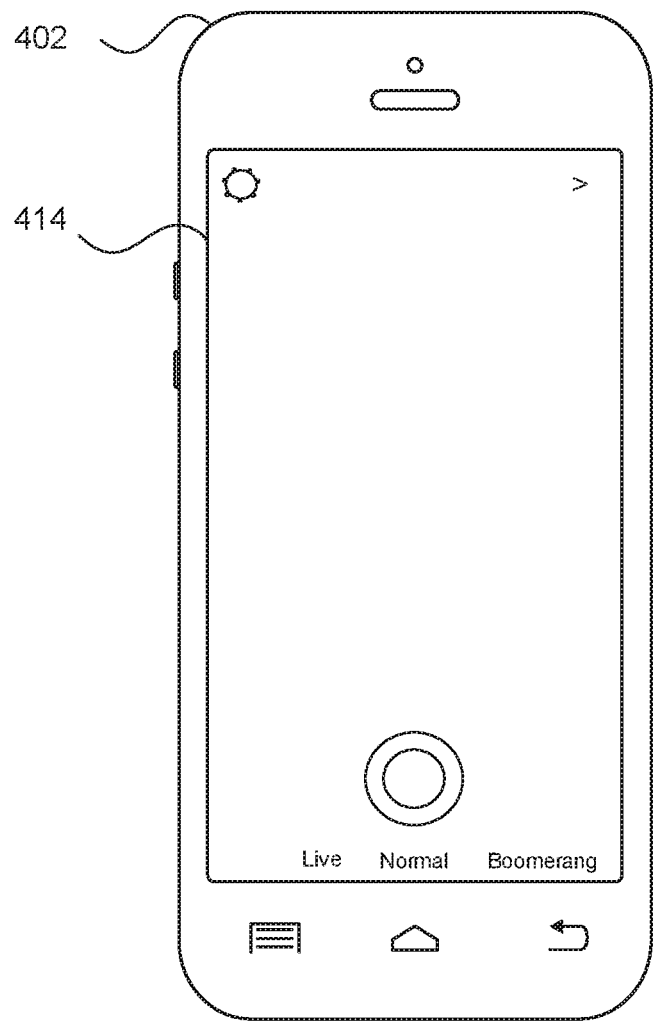

In some embodiments, the user operating the computing device 402 can access a camera pane interface 414 as illustrated in the example of FIG. 4B. The interface 414 may be accessed, for example, by performing a touch screen gesture (e.g., swipe gesture). For example, the user can access the camera pane interface 414 from the interface 404 by swiping to the right. The camera pane interface 414 can be used to capture various forms of media (e.g., images, videos, boomerangs, etc.). In some embodiments, accessing the camera pane interface 414 causes a camera application to execute on the computing device 402 being operated by the user. In some instances, the camera pane interface 414 can automatically be presented in response to the user selecting an option to reply to an ephemeral message.

Figure 4C:
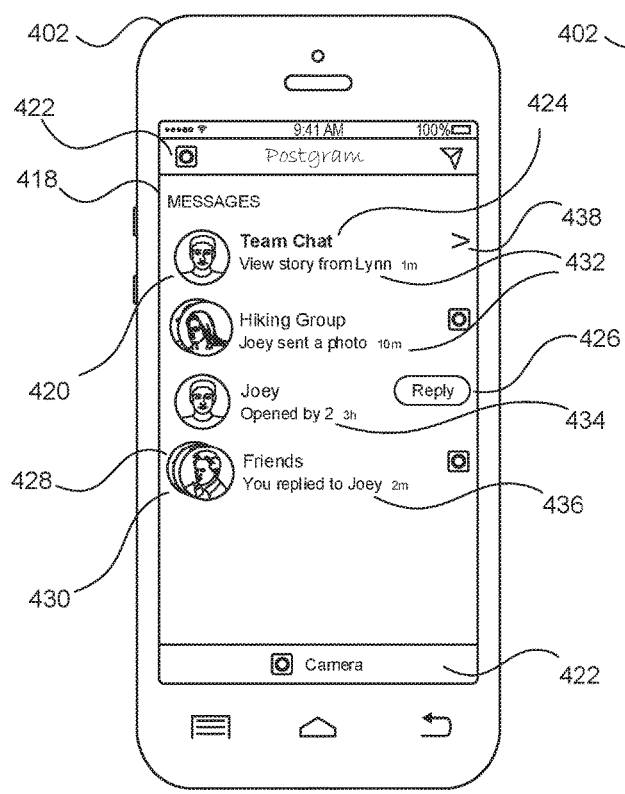
Figure 4D:
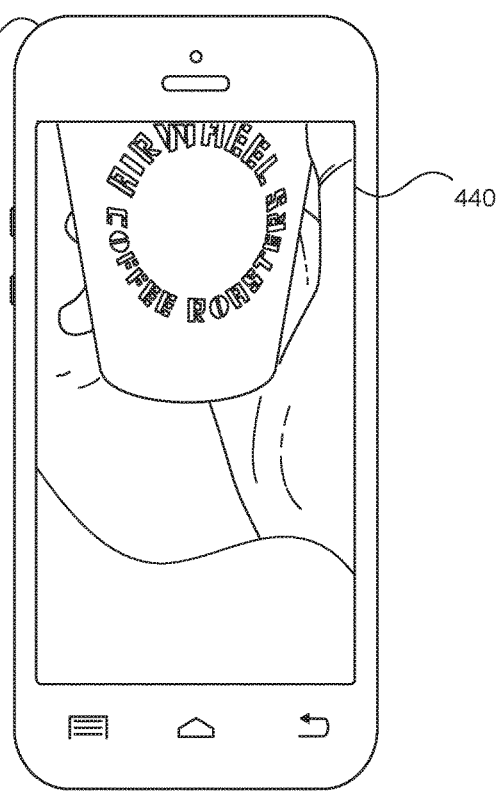
Figure 4E:
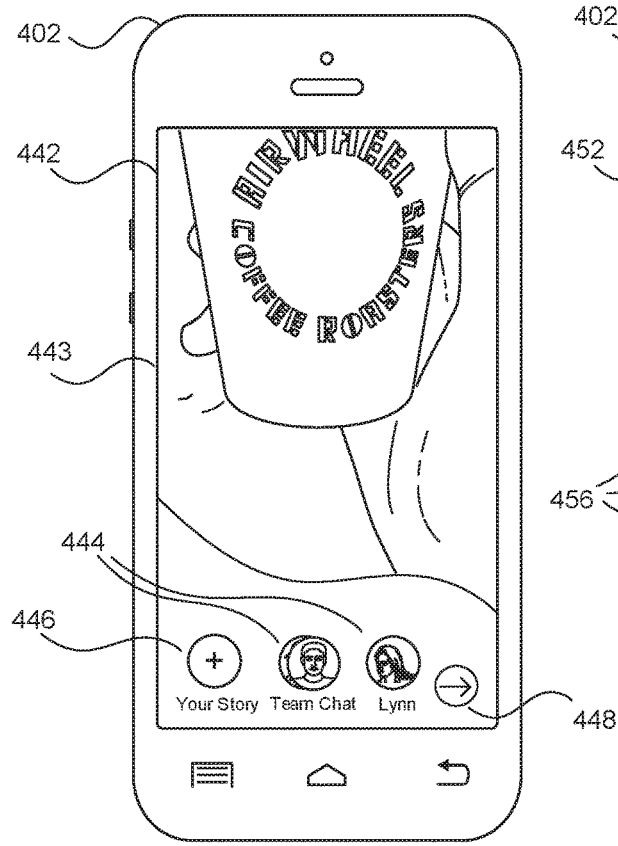
Figure 4F:
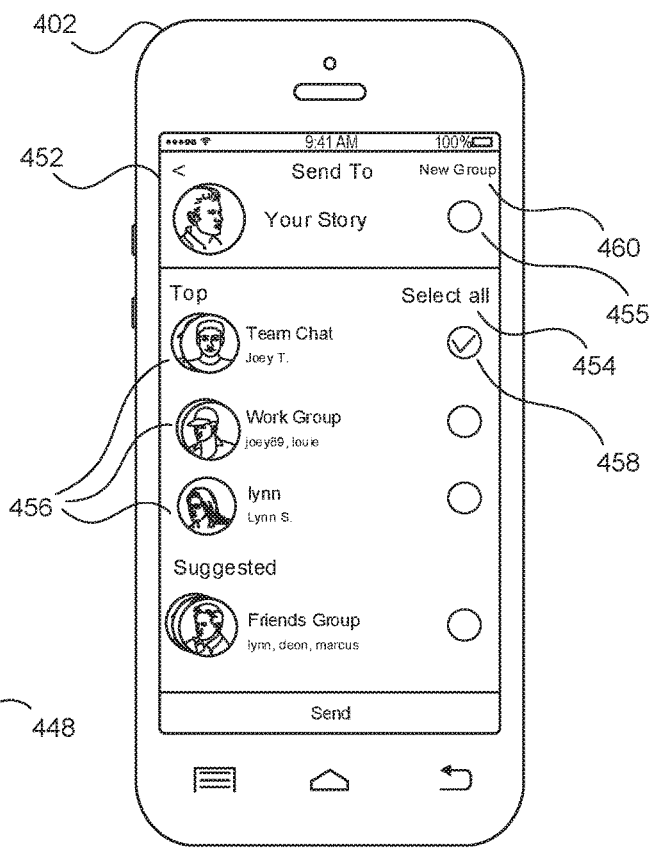
Figures 4G, 4H:
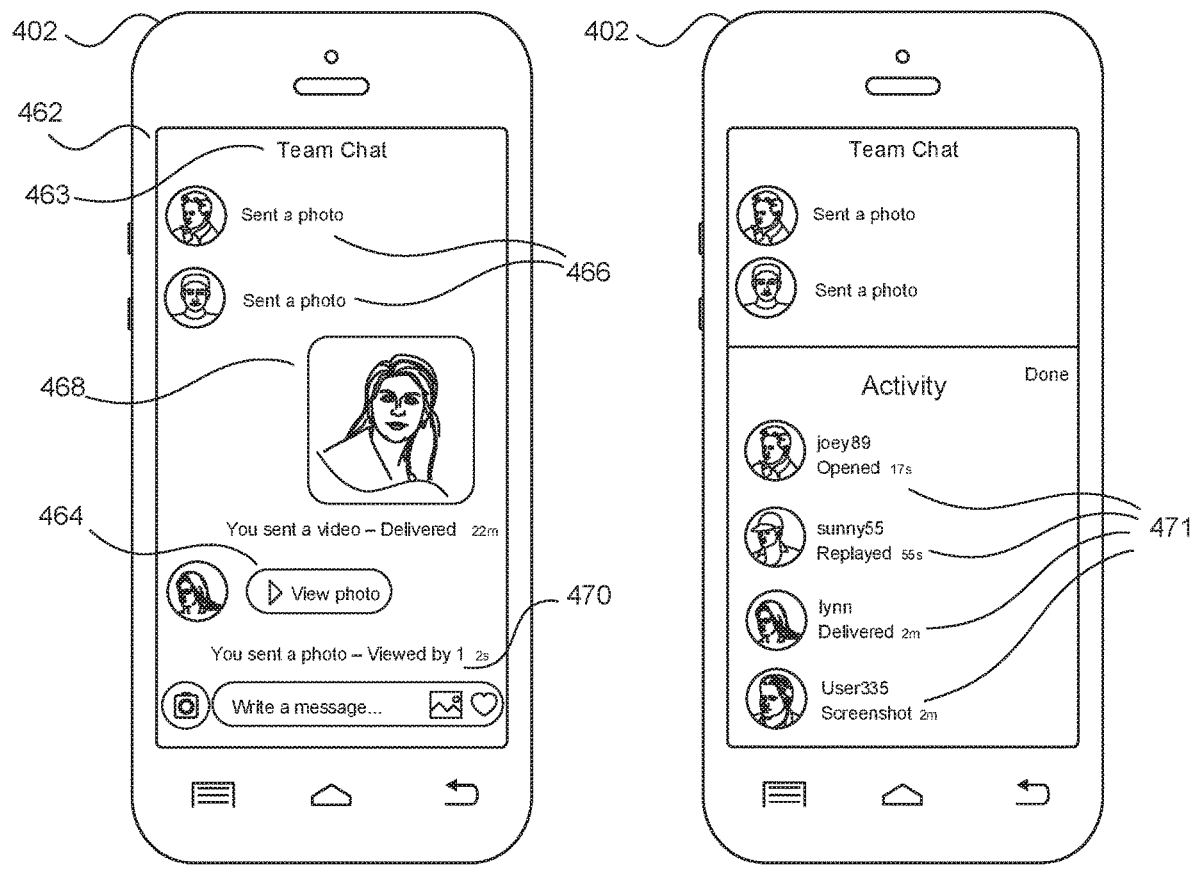

In some embodiments, the user operating the computing device 402 can access a message pane interface 418 as illustrated in the example of FIG. 4C. The interface 418 may be accessed, for example, by performing a touch screen gesture (e.g., swipe gesture). For example, the user can access the message pane interface 418 from the interface 404 by swiping to the left. The interface 418 can provide access to a message pane through which the user can send and access messages. In some embodiments, such messages are exchanged through unified message threads. A unified message thread 428 can be associated with a set of one or more avatars 430. The set of avatars 430 can appear as a stack. Each avatar can each represent a user that is a member of the unified message thread. In some embodiments, avatars associated with a given unified message thread correspond to users that sent ephemeral messages which have not been viewed by the user operating the computing device 402. In some embodiments, avatars associated with a given unified message thread correspond to users that sent ephemeral messages and/or non-ephemeral messages which have not been viewed by the user operating the computing device 402. In some embodiments, the set of avatars 430 can be layered (or ranked). In some embodiments, layering (or ranking) of the set of avatars 430 can be customized or otherwise based on the user operating the computing device 402. For example, in some embodiments, an avatar of a user that sent the oldest ephemeral message unseen by the user operating the computing device 402 is displayed on top of the set of avatars 430. In some embodiments, when a given unified message thread includes ephemeral messages and non-ephemeral messages, avatars corresponding to users that sent the ephemeral messages are prioritized in appearance over, or shown at a level in a stack higher than, avatars corresponding to users that sent the non-ephemeral messages. In some embodiments, when the set of avatars 430 is selected, the interface 418 can present or display the unseen ephemeral messages that were sent by users associated with the set of avatars 430. In some embodiments, these unseen ephemeral messages are played (or displayed) chronologically in the order they were received, for example, through an immersive content viewer 440 as illustrated in the example of FIG. 4D. In some embodiments, the immersive content viewer 440 presents all unseen ephemeral messages that were exchanged through the unified message thread first followed by all unseen non-ephemeral messages that were exchanged through the same unified message thread. In some embodiments, the user can bypass this presentation of content through the immersive content viewer 440 by selecting a chevron 438 associated with a unified message thread 420. In such embodiments, selecting the chevron 438 causes the unified message thread 420 to be presented, for example, as illustrated in the example of FIG. 4G. While accessing the unified message thread 420, the user can individually select to view unseen ephemeral messages one at a time. In some embodiments, a reference associated with a message thread, such as text (e.g., a name 424 of the unified message thread 420) associated with a message thread, is presented with a distinctive mark or identifier, such as a particular color (e.g., blue), when at least one unseen ephemeral message is accessible through the unified message thread 420.

In various embodiments, the interface 418 can provide information corresponding to each of the message threads. For example, in some embodiments, the interface 418 can provide a description of the last message 432 that was sent in a given unified message thread and the name of the sender (e.g., "View story from Lynn", "Joey sent a photo"). In some embodiments, the interface 418 can provide seen state information 434 for a message that was sent by the user operating the computing device 402 (e.g., Delivered, Opened, Opened by some number of users). In some embodiments, the interface 418 can provide a description of the last action 436 that was performed by the user with respect to a given unified message thread (e.g., "You replied to Joey", "You sent a photo").

In some embodiments, a reply option (or button) 426 for replying to one or more ephemeral messages in a given unified message thread can be provided. In such embodiments, the user can select (e.g., tap) the reply option 426 to access the camera pane interface 414. The user can then capture content, such as an image or video, using the camera pane interface 414. This captured content can be sent as one or more ephemeral messages directly through the unified message thread associated with the reply option 426. In some embodiments, the user can long-press the reply option 426 to access the camera pane interface 414 with the camera automatically actively capturing video content. In some embodiments, when the last message shared in a unified message thread is a non-ephemeral message, selecting a reply option associated with the unified message thread causes the thread to be presented as illustrated in FIG. 4G. In some embodiments, a virtual keyboard is presented if the non-ephemeral message being replied to is a text message.

In some embodiments, the interface 418 also includes one or more options 422 that can be selected to send an ephemeral message. In some embodiments, the option 422 corresponds to a camera icon. In some embodiments, the option 422 is presented in a particular color (e.g., blue) to signify that content captured using the camera is ephemeral and may be sent as ephemeral messages. Upon selecting the option 422, the user can be presented with the camera pane interface 414. The user can capture one or more content items through the camera pane interface 414, as illustrated in the example of FIG. 4E. When a desired content item 442 has been captured, the user can share the content item 442 through one or more unified message threads 444 and/or as a story 446, which can be selected directly from the camera pane interface 443. In some embodiments, the unified message threads 444 shown in the camera pane interface 443 are ranked based on various approaches. For example, the unified message threads 444 may be ranked based on how often the user interacts with a given unified message thread, how many messages the user sends through a given unified message thread, and/or a relationship strength between the user and one or more members of a given unified message thread. Alternatively, in some embodiments, the user can select an option 448 to share the content item 442 with other users. After selecting the option 448, the user can be presented with a sharing interface 452, as illustrated in the example of FIG. 4F. The user then has several options for sharing the content item 442. For example, the user can share the content item 442 as a story that is published through the user's ephemeral content feed 410. In this example, the shared story may be published through the user's ephemeral content feed 410 by selecting an option 455. This story can be consumed by other users (e.g., followers) that can access the user's ephemeral content feed 410. In some embodiments, content items (e.g., the content item 442) posted as stories through an ephemeral content feed are accessible by the other users for a pre-determined time period, such as 24-hour period. Once this pre-determined time period expires, the content items are removed (or made inaccessible) from the ephemeral content feed. In addition to sharing the content item 442 as a story, the user can also provide the content item 442 as an ephemeral message to other users of the social networking system as a direct message. A direct message region 454 of the interface 452 can display avatars 456 corresponding to one or more unified message threads. In some embodiments, these unified message threads are selected and ranked. For example, the message threads 444 may be ranked based on how often the user interacts with a given unified message thread, how many messages the user sends through a given unified message thread, and/or a relationship strength between the user and one or more members of a given unified message thread. The user can select one or more of these unified message threads as recipients of the content item 442. In the example of FIG. 4F, the user has selected a message group 458 as the recipient of the ephemeral message which includes the content item 442. If other recipients are intended, the user can select an option 460 to create a new unified message thread with a different recipient or group of recipients. The options for sharing content items are not mutually exclusive. That is, the user can share the content item 442 as a story, as a direct message, or both. As mentioned, the content item 442 will have an ephemeral life span of pre-determined time period (e.g., 24 hours) when shared as a story. If sent as an ephemeral message to another user, the content item 442 will be accessible until the other user accesses the ephemeral message, until the other user accesses the ephemeral message a pre-defined number of times, or for as long as the other user is engaged in a session associated with a unified message thread including the content item 442, as just some examples.

FIG. 4G illustrates an example message thread interface 462 presenting content that was shared by members of a given unified message thread 463 (e.g., "Team Chat"). As mentioned, members of the unified message thread 463 can share both ephemeral and non-ephemeral messages through the same thread 463. In the example of FIG. 4G, ephemeral messages received from members can be accessed by selecting a corresponding view option. For example, an ephemeral message containing a photo can be accessed by selecting a view option 464 associated with the ephemeral message. When the option 464 is selected, the ephemeral message can be presented to the user, for example, through an immersive content viewer. In some embodiments, ephemeral messages can be accessed by a user for a pre-defined number of times (e.g., once, twice, etc.) after which the ephemeral messages can no longer be accessed by the user. Once this pre-defined limit is reached, the view option associated with the ephemeral message becomes a tombstone (or anchor) 466 to indicate that a given member previously sent an ephemeral message. In some embodiments, two or more consecutively shown tombstones can be collapsed automatically. For example, instead of displaying 12 consecutive tombstones corresponding to previously sent ephemeral messages, the interface 462 can display one tombstone with a message indicating that some number of ephemeral messages were shared (e.g., "12 messages"). In some embodiments, this collapsed tombstone can be selected (e.g., long-pressed) to reveal information corresponding to each of the collapsed ephemeral messages including, for example, the name of the sender, the type of content sent (e.g., photo, video), and a corresponding timestamp.

In some embodiments, ephemeral messages sent by the user operating the computing device 402 are not shown within the message thread interface 462. In such embodiments, a corresponding tombstone or anchor (e.g., the tombstone 470) referencing the ephemeral message is shown. In some embodiments, the user can select (e.g., tap, long-press) the tombstone 470 to view the ephemeral message for a pre-defined number of times (e.g., once, twice, etc.). In some embodiments, the option to view the ephemeral message may be available only while the user is accessing the unified message thread 463 in the same session. In some embodiments, a session may be defined as a period of time during which the user accesses a given unified message thread. In such embodiments, the session begins when the user enters the unified message thread and ends when the user exits the message thread. In various embodiments, non-ephemeral messages are also presented within the unified message thread 463. For example, in FIG. 4G, a content item (e.g., video) sent by a user operating the computing device 402 as a non-ephemeral message 468 is presented within the unified message thread 463. In some embodiments, a user that sent a message (e.g., ephemeral message or a non-ephemeral message) can recall the message provided that no recipients have viewed the message. Once recalled, no recipient of the message will be able to access the message. In some embodiments, such access restrictions for the message can be enabled by expiring a Uniform Resource Locator (URL) that references the message.

In some embodiments, seen states associated with ephemeral and non-ephemeral messages can be provided. For example, in some embodiments, respective seen states 471 for a given message can indicate whether the message was delivered to one or more users, viewed (or opened) by one or more users, or replayed by one or more users. In some embodiments, messages (e.g., non-ephemeral messages in a message thread, a tombstone corresponding to an ephemeral message) can be selected (e.g., tapped, long-pressed) to reveal respective seen states for each recipient of the message, as illustrated in the example of FIG. 4H. Such seen states can indicate, for a given user, whether the message was delivered to the user, whether the user viewed (or opened) the message, and/or whether the user replayed the message. In some embodiments, the seen state can indicate whether a given user took a screenshot of the message.

Figure 4I:
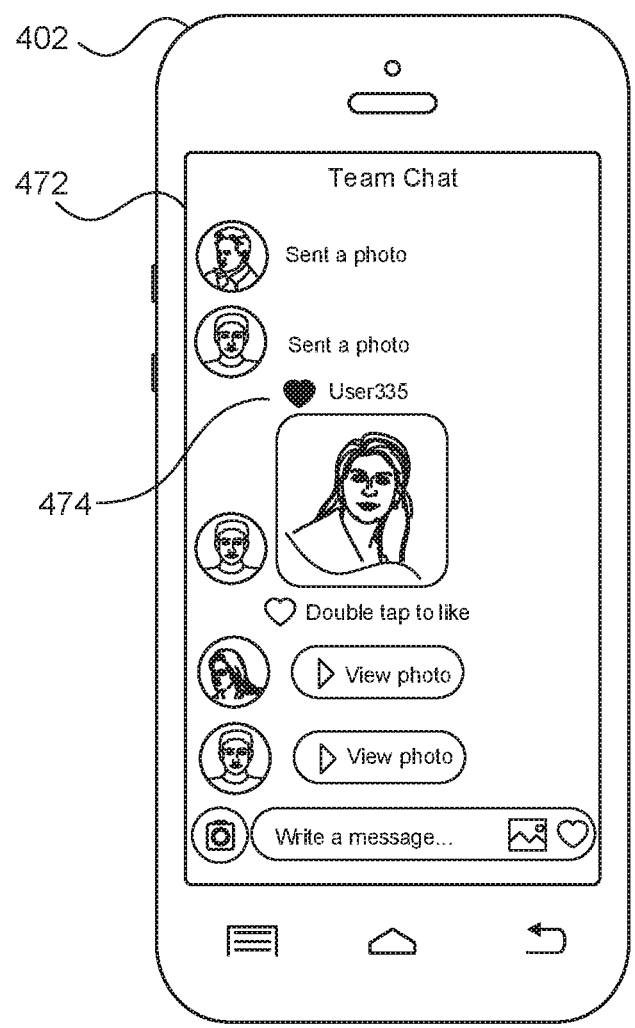

In some embodiments, users can interact with ephemeral messages and non-ephemeral messages in a given message thread 472. For example, in some embodiments, users can like messages 474 (e.g., double tap to like) sent by other members of the message thread, as illustrated in the example of FIG. 4I.

Figure 4J:
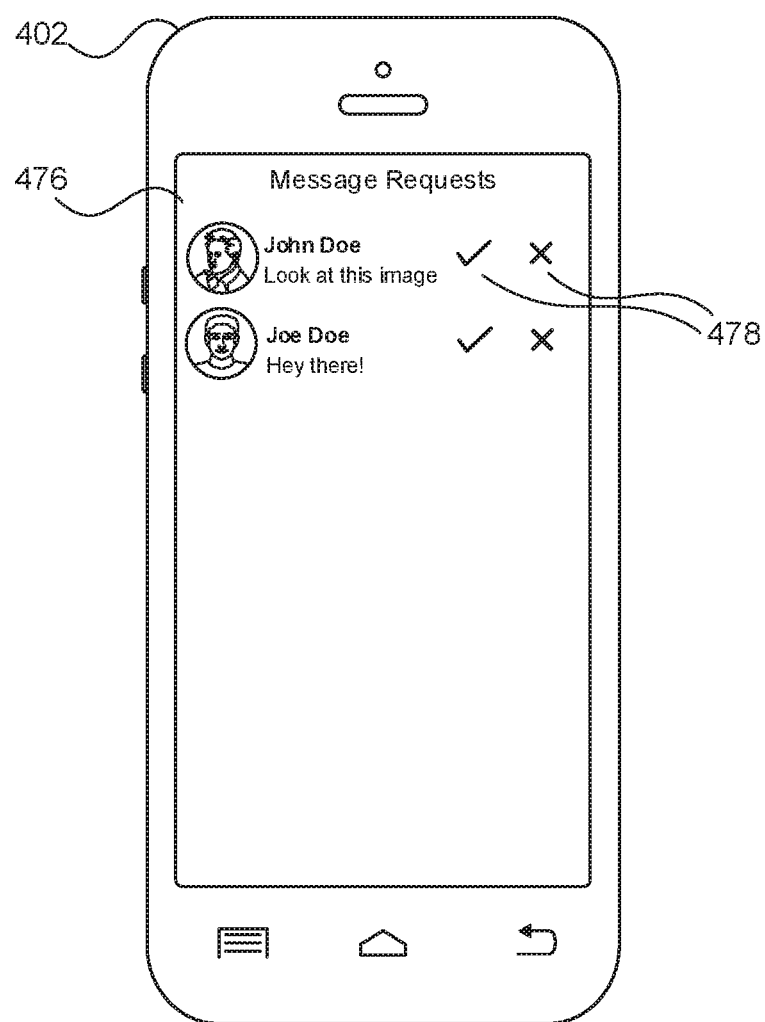

In some embodiments, a first user may send an ephemeral message or a non-ephemeral message to any other user of the social networking system. In such embodiments, the message can be sent with a message request. The recipient of the message can accept the message request to view the message. For example, the recipient can accept or reject the message request using options 478 in a message request interface 476, as illustrated in the example of FIG. 4J.

FIG. 5A illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, a first ephemeral message to be shared through a first unified message thread corresponding to a group of recipients is determined, the first ephemeral message being created by a user operating the computing device. At block 504, the first ephemeral message can be provided to a social networking system for distribution to the group of recipients through the first unified message thread, wherein both ephemeral messages and non-ephemeral messages are exchanged between the group of recipients through the same first unified message thread.

Figure 5B:
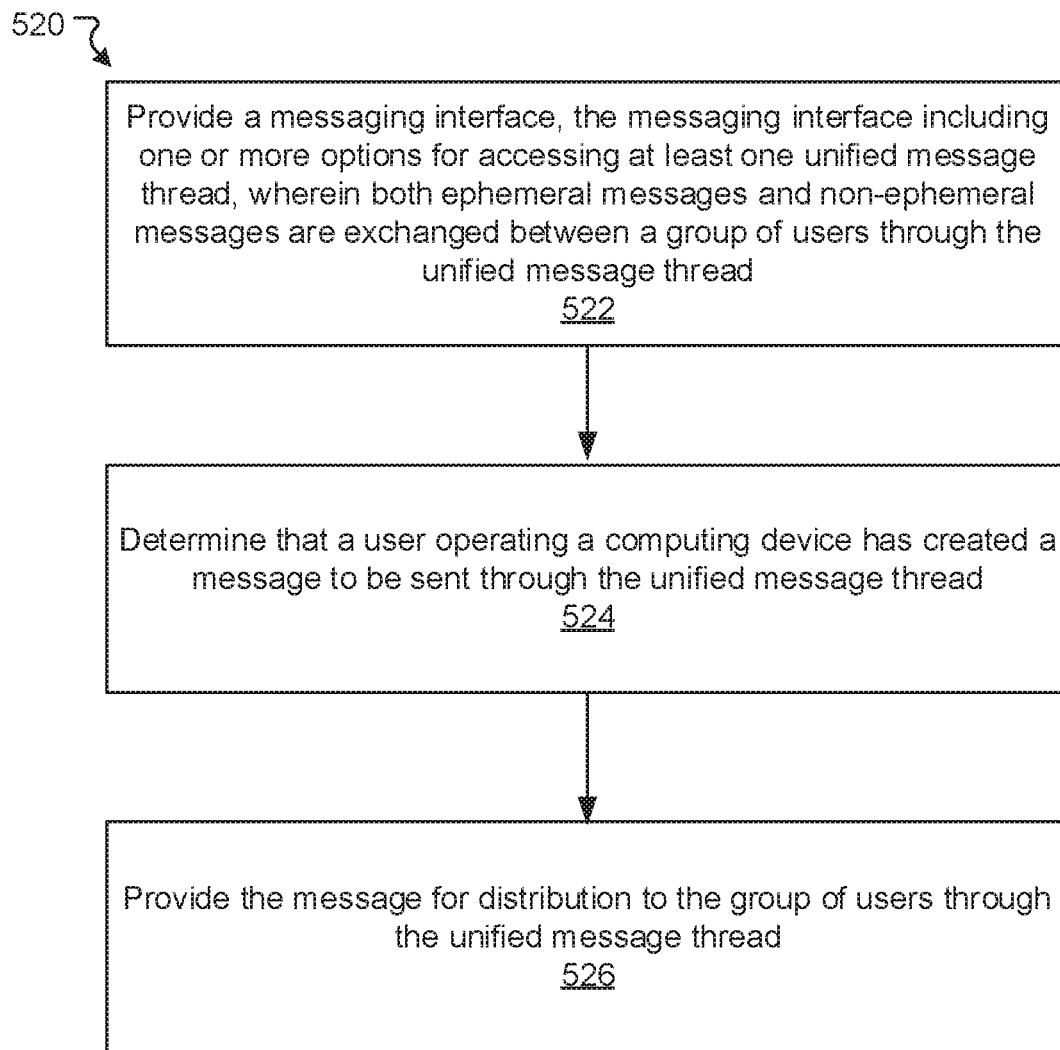

FIG. 5B illustrates an example method 520, according to an embodiment of the present disclosure. It should be appreciated that there can be additional, fewer, or alternative steps performed in similar or alternative orders, or in parallel, within the scope of the various embodiments discussed herein unless otherwise stated.

At block 522, a messaging interface is provided, the messaging interface including one or more options for accessing at least one unified message thread, wherein both ephemeral messages and non-ephemeral messages are exchanged between a group of users through the unified message thread. At block 524, a determination can be made that a user operating the computing device has created a message to be sent through the unified message thread. At block 526, the message can be provided for distribution to the group of users through the unified message thread.

Figure 5C:
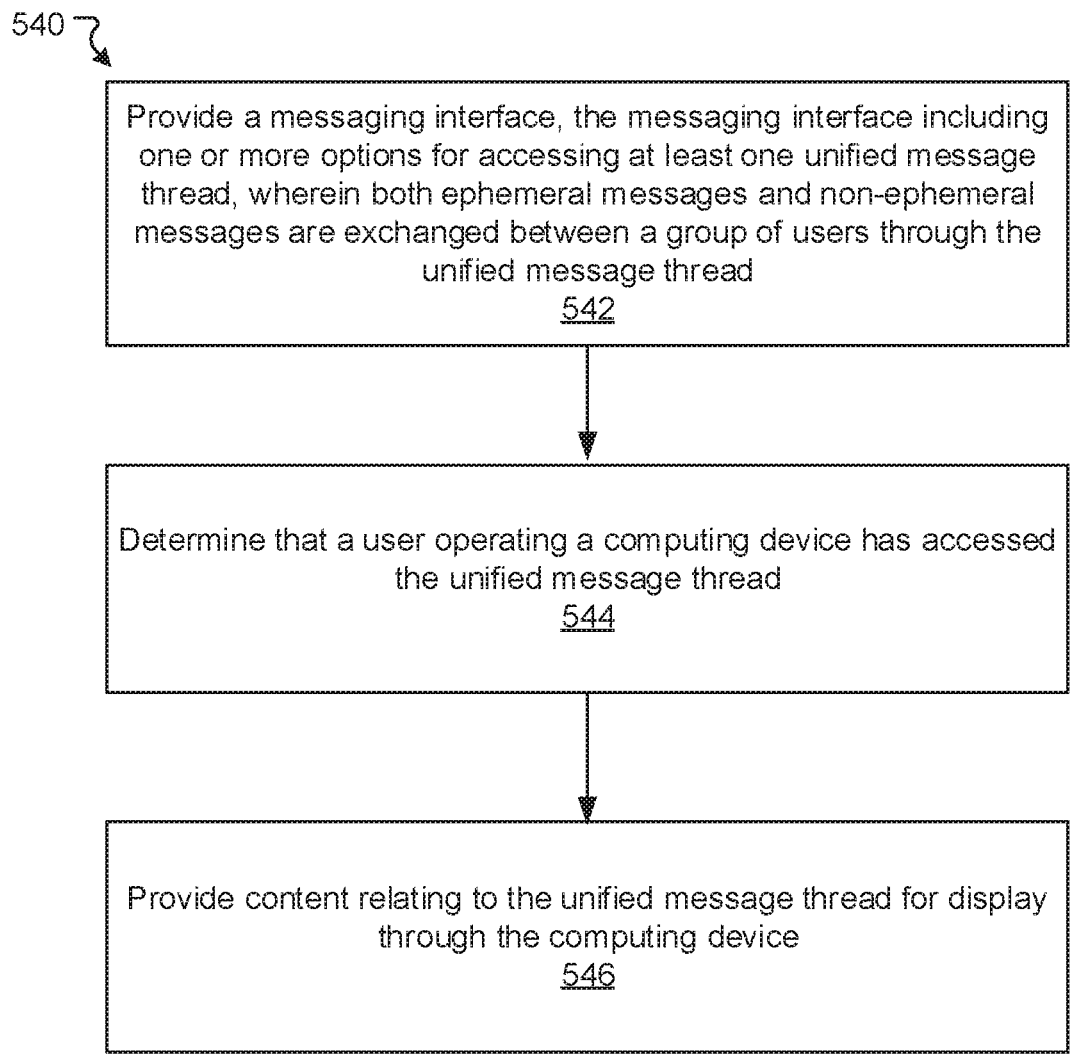

FIG. 5C illustrates an example method 540, according to an embodiment of the present disclosure. It should be appreciated that there can be additional, fewer, or alternative steps performed in similar or alternative orders, or in parallel, within the scope of the various embodiments discussed herein unless otherwise stated.

At block 542, a messaging interface can be provided. The messaging interface including one or more options for accessing at least one unified message thread, wherein both ephemeral messages and non-ephemeral messages are exchanged between a group of users through the unified message thread. At block 544, a determination can be made that a user operating the computing device has accessed the unified message thread. At block 546, content relating to the unified message thread can be provided for display through the computing device.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
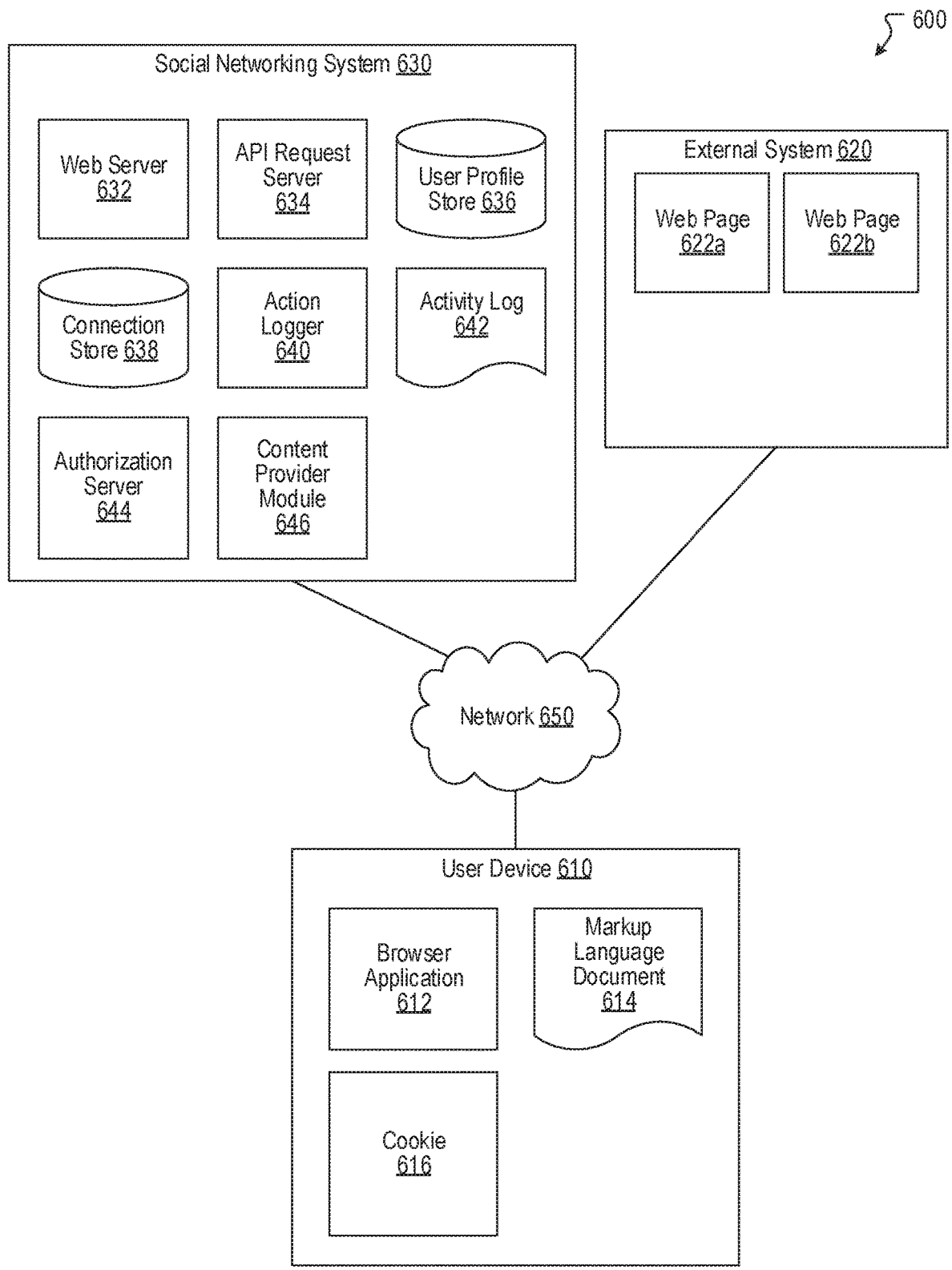
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes"

another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, the content provider module 646, in whole or in part, is also implemented in the user device 610. As discussed previously, it should be appreciated that there can be many variations or other possibilities.

Hardware Implementation

Figure 7:
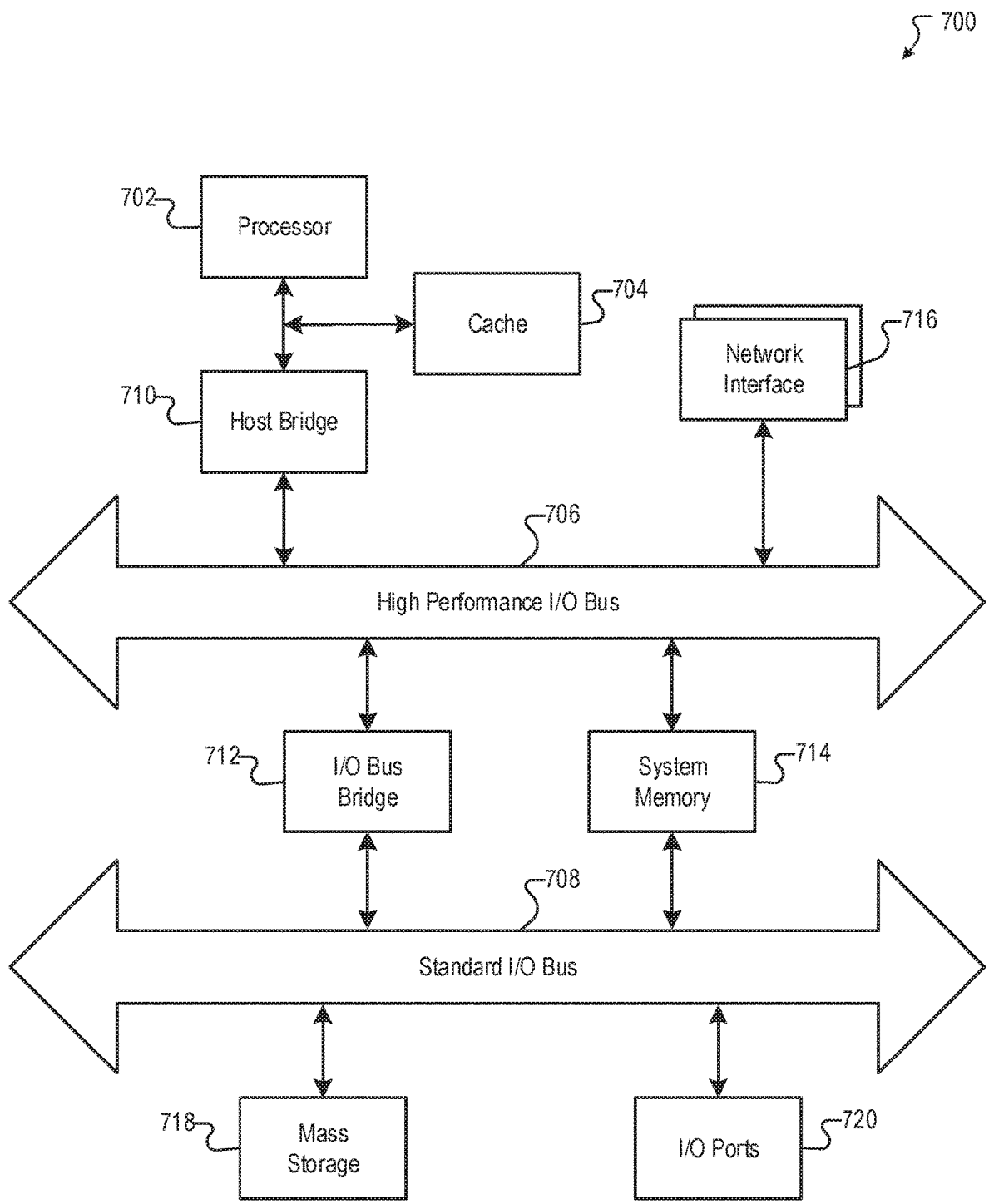
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing system, an ephemeral message to be shared through a unified message thread associated with a group of users, wherein the group of users includes one or more recipients and a user that created the ephemeral message;
    providing, by the computing system, the ephemeral message for distribution through the unified message thread, wherein both ephemeral messages and non-ephemeral messages are exchanged among the group of users through the unified message thread, and wherein each of the one or more recipients is permitted to access the ephemeral message a pre-defined number of times;
    determining, by the computing system, that a first recipient included in the one or more recipients has accessed the ephemeral message the pre-defined number of times;
    determining, by the computing system, that a second recipient included in the one or more recipients has accessed the ephemeral message less than the pre-defined number of times;
    in response to determining that the first recipient has accessed the ephemeral message the pre-defined number of times, providing, by the computing system, a tombstone of the ephemeral message within the unified message thread, wherein the tombstone no longer permits the first recipient to access the ephemeral message through the unified message thread, and wherein the tombstone can be selected to reveal information describing the ephemeral message; and
    in response to determining that the second recipient has accessed the ephemeral message less than the pre-defined number of times, providing, by the computing system, a view option associated with the ephemeral message that is accessible to the second recipient, wherein the view option permits the second recipient to access the ephemeral message through the unified message thread.

2. The computer-implemented method of claim 1, wherein a recipient is permitted to view text associated with the ephemeral message without having accepted a message request but not the ephemeral message itself.

3. The computer-implemented method of claim 1, wherein the ephemeral message is not visible in the unified message thread to the user that created the ephemeral message.

4. The computer-implemented method of claim 1, wherein the user that created the ephemeral message is permitted to view the ephemeral message in the unified message thread for the pre-defined number of times.

5. The computer-implemented method of claim 1, the method further comprising:
    determining, by the computing device, a selection of an option to recall the ephemeral message by the user that created the ephemeral message; and
    preventing, by the computing device, the one or more recipients in the group from accessing the ephemeral message.

6. The computer-implemented method of claim 1, wherein determining the ephemeral message to be shared through the unified message thread associated with the group of users further comprises:
    providing, by the computing device, a set of options for sharing the ephemeral message, the set of options including at least a first option for sharing the ephemeral message as a story and a second option for sharing the ephemeral message through the unified message thread; and
    determining, by the computing device, a selection of at least the second option.

7. The computer-implemented method of claim 1, the method further comprising:
    determining, by the computing device, at least one notification corresponding to the ephemeral message, the notification describing a seen state for a recipient in the group of users; and
    providing, by the computing device, the notification in the unified message thread.

8. The computer-implemented method of claim 7, wherein the seen state indicates the ephemeral message was delivered to the recipient, viewed by the recipient, or replayed by the recipient.

9. The computer-implemented method of claim 1, wherein access to the ephemeral message expires after occurrence of some pre-defined event, and wherein access to a non-ephemeral message does not expire.

10. A system comprising:
  at least one processor; and
  a memory storing instructions that, when executed by the at least one processor, cause the system to perform:
  determining an ephemeral message to be shared through a unified message thread associated with a group of users, wherein the group of users includes one or more recipients and a user that created the ephemeral message;
  providing the ephemeral message for distribution through the unified message thread, wherein both ephemeral messages and non-ephemeral messages are exchanged among the group of users through the unified message thread, and wherein each of the one or more recipients is permitted to access the ephemeral message a pre-defined number of times;
  determining that a first recipient included in the one or more recipients has accessed the ephemeral message the pre-defined number of times;
  determining that a second recipient included in the one or more recipients has accessed the ephemeral message less than the pre-defined number of times;
  in response to determining that the first recipient has accessed the ephemeral message the pre-defined number of times, providing a tombstone of the ephemeral message within the unified message thread, wherein the tombstone no longer permits the first recipient to access the ephemeral message through the unified message thread, and wherein the tombstone can be selected to reveal information describing the ephemeral message; and
  in response to determining that the second recipient has accessed the ephemeral message less than the pre-defined number of times, providing a view option associated with the ephemeral message that is accessible to the second recipient, wherein the view option permits the second recipient to access the ephemeral message through the unified message thread.

11. The system of claim 10, wherein a recipient is permitted to view text associated with the ephemeral message without having accepted a message request but not the ephemeral message itself.

12. The system of claim 10, wherein the ephemeral message is not visible in the unified message thread to the user that created the ephemeral message.

13. The system of claim 10, wherein the user that created the ephemeral message is permitted to view the ephemeral message in the unified message thread for the pre-defined number of times.

14. A non-transitory computer-readable storage medium including instructions that, when executed by at least one processor of a computing system, cause the computing system to perform a method comprising:
  determining an ephemeral message to be shared through a unified message thread associated with a group of users, wherein the group of users includes one or more recipients and a user that created the ephemeral message;
  providing the ephemeral message for distribution through the unified message thread, wherein both ephemeral messages and non-ephemeral messages are exchanged among the group of users through the unified message thread, and wherein each of the one or more recipients is permitted to access the ephemeral message a pre-defined number of times;
  determining that a first recipient included in the one or more recipients has accessed the ephemeral message the pre-defined number of times;
  determining that a second recipient included in the one or more recipients has accessed the ephemeral message less than the pre-defined number of times;
  in response to determining that the first recipient has accessed the ephemeral message the pre-defined number of times, providing a tombstone of the ephemeral message within the unified message thread, wherein the tombstone no longer permits the first recipient to access the ephemeral message through the unified message thread, and wherein the tombstone can be selected to reveal information describing the ephemeral message; and
  in response to determining that the second recipient has accessed the ephemeral message less than the pre-defined number of times, providing a view option associated with the ephemeral message that is accessible to the second recipient, wherein the view option permits the second recipient to access the ephemeral message through the unified message thread.

15. The non-transitory computer-readable storage medium of claim 14, wherein a recipient is permitted to view text associated with the ephemeral message without having accepted a message request but not the ephemeral message itself.

16. The non-transitory computer-readable storage medium of claim 14, wherein the ephemeral message is not visible in the unified message thread to the user that created the ephemeral message.

17. The non-transitory computer-readable storage medium of claim 14, wherein the user that created the ephemeral message is permitted to view the ephemeral message in the unified message thread for the pre-defined number of times.

18. The system of claim 10, wherein the instructions further cause the system to perform:
  determining at least one notification corresponding to the ephemeral message, the notification describing a seen state for a recipient in the group of users; and
  providing the notification in the unified message thread.

19. The non-transitory computer-readable storage medium of claim 14, wherein the instructions further cause the computing system to perform:
  determining at least one notification corresponding to the ephemeral message, the notification describing a seen state for a recipient in the group of users; and
  providing the notification in the unified message thread.

* * * * *